US012764808B2

(12) United States Patent
Audi et al.

(10) Patent No.: US 12,764,808 B2
(45) Date of Patent: Oct. 13, 2026

(54) DIRECT CHANNEL GENERATION

(71) Applicant: BLUSTREAM CORPORATION, Worcester, MA (US)

(72) Inventors: Michael Dominick Audi, Worcester, MA (US); William Buote, Worcester, MA (US); Kenneth N. Rapp, Sutton, MA (US); Robert Bean, Worcester, MA (US); James Michael Gordon, Jr., Worcester, MA (US)

(73) Assignee: BLUSTREAM CORPORATION, Worcester, MA (US)

( * ) Notice: Subject to any disclaimer, the term of this patent is extended or adjusted under 35 U.S.C. 154(b) by 443 days.

(21) Appl. No.: 18/040,729

(22) PCT Filed: Aug. 6, 2021

(86) PCT No.: PCT/US2021/045113

§ 371 (c)(1),
(2) Date: Feb. 6, 2023

(87) PCT Pub. No.: WO2022/032201

PCT Pub. Date: Feb. 10, 2022

(65) Prior Publication Data

US 2023/0309162 A1 Sep. 28, 2023

Related U.S. Application Data

(60) Provisional application No. 63/062,831, filed on Aug. 7, 2020.

(51) Int. Cl.
*H04W 76/14* (2018.01)
*G01S 17/00* (2020.01)
(Continued)

(52) U.S. Cl.
CPC ............. *H04W 76/14* (2018.02); *G01S 17/00* (2013.01); *H04L 67/12* (2013.01); *H04W 4/38* (2018.02)

(58) Field of Classification Search
CPC ......... H04W 76/14; H04W 4/38; G01S 17/00; H04L 67/12; H04L 69/14
See application file for complete search history.

(56) References Cited

U.S. PATENT DOCUMENTS 7,889,719 B2 * 2/2011 Xu .................... H04M 3/42229 709/236
8,161,106 B2 * 4/2012 Quinn .................... G06Q 10/00 463/43
(Continued)

OTHER PUBLICATIONS

International Search Report corresponding to Internatonal Patent Application No. PCT/US2021/045113 dated Nov. 1, 2021, 10 pages.

*Primary Examiner* — Michael A Keller

(57) ABSTRACT

A method of establishing a communication channel includes receiving sensor data characterizing measurements associated with a target object. The method includes determining, based on the sensor data, an objective from a plurality of predefined objectives for monitoring the target object. The method includes computing, based on the determined objective, a communication channel associated with the target object. The method includes providing the communication channel. Related apparatus, systems, techniques, and articles are also described.

24 Claims, 9 Drawing Sheets

(51) Int. Cl.
*H04L 67/12* (2022.01)
*H04W 4/38* (2018.01)

(56) References Cited

U.S. PATENT DOCUMENTS

| | | | | |
|---|---|---|---|---|
| 8,406,141 | B1 * | 3/2013 | Couturier | G06F 16/951 370/241 |
| 8,751,636 | B2 * | 6/2014 | Tseng | G06Q 50/01 709/224 |
| 8,868,769 | B2 * | 10/2014 | Prywes | G10L 13/00 709/230 |
| 9,203,796 | B2 * | 12/2015 | Hsiao | G06N 5/025 |
| 9,560,001 | B1 * | 1/2017 | Collins | H04L 51/52 |
| 9,870,432 | B2 * | 1/2018 | Holm | G06F 16/9024 |
| 9,876,894 | B2 * | 1/2018 | Prado | H04L 51/234 |
| 10,061,826 | B2 * | 8/2018 | Helvik | G06F 16/24575 |
| 10,169,457 | B2 * | 1/2019 | Miller | G06Q 50/01 |
| 10,394,827 | B2 * | 8/2019 | Stickler | H04L 67/10 |
| 10,511,564 | B2 * | 12/2019 | Govande | H04L 67/54 |
| 10,657,471 | B2 * | 5/2020 | Girishankar | H04L 51/234 |
| 10,757,201 | B2 * | 8/2020 | Helvik | G06Q 10/10 |
| 11,062,401 | B1 * | 7/2021 | Zhao | G06Q 50/01 |
| 11,210,746 | B1 * | 12/2021 | Zhao | H04L 67/535 |
| 11,314,798 | B2 * | 4/2022 | Sankovsky | G06F 16/345 |
| 11,411,895 | B2 * | 8/2022 | Voss | H04L 51/222 |
| 11,586,485 | B2 * | 2/2023 | Laurenzio | G08B 5/22 |
| 11,645,289 | B2 * | 5/2023 | Helvik | G06F 16/24578 707/749 |
| 2017/0092102 | A1 * | 3/2017 | Fusakawa | G06Q 10/06 |
| 2020/0226542 | A1 * | 7/2020 | Lau | A61B 5/0022 |
| 2020/0242282 | A1 * | 7/2020 | Santarone | G06F 3/0346 |

* cited by examiner

DIRECT CHANNEL GENERATION

RELATED APPLICATION

This application is a national stage application, which claims priority under 35 U.S.C. 371 to PCT Application No. PCT/US2021/045113, filed on Aug. 6, 2021 and entitled "DIRECT CHANNEL GENERATION." which claims priority under 35 U.S.C. § 119(e) to U.S. Provisional Patent Application No. 63/062,831, filed on Aug. 7, 2020 and entitled "DIRECT CHANNEL GENERATION," the entire contents of which are hereby expressly incorporated by reference herein in their entirety.

TECHNICAL FIELD

The subject matter described herein relates to direct channel generation systems and methods.

BACKGROUND

Sensors are an integral part of modern electronic devices such as cellphones, automobile circuitry, and the like. A sensor can detect physical properties such as motion, temperature, position, and the like, and generate a signal that represents the detected physical property. The generated signal can be processed and stored by a computing device. The computing device can control the operation of the sensor. For example, the computing device can control the operation of the sensor (e.g., change the operating parameters associated with the sensor).

SUMMARY

In an aspect, a method includes receiving sensor data characterizing measurements associated with a target object. The method includes determining, based on the sensor data, an objective from a plurality of predefined objectives for monitoring the target object. The method includes computing, based on the determined objective, a communication channel associated with the target object. The method includes providing the communication channel.

One or more of the following features can be included in any feasible combination. For example, in some aspects, the method can include determining one or more characteristic of the communication channel. In other aspects, the method can include providing the determined one or more characteristics of the communication channel. In certain aspects, the determined characteristic can be at least one of a user preference or a status of the target object.

In some aspects, the method can further include establishing the communication channel between a service provider and a user associated with the object via a server containing a machine-learning algorithm, a plurality of pre-stored statuses of the target object, and a plurality of associated service providers. In some aspects, the service provider can be associated with the determined objective for monitoring the target object via the machine-learning algorithm, the plurality of pre-stored statuses of the target object, and the plurality of associated service providers. In other aspects, the sensor data can include data associated with at least one of a timer, an accelerometer, a global positioning system, a position sensor, a thermometer, a humidity sensor, a visible light sensor, or a non-visible light sensor.

In some aspects, the method can include receiving second sensor data characterizing second measurements associated with the target object at time after receiving previous sensor data.

In some aspects, the method can include determining a status of the target object. In other aspects, the status of the target object can be based on at least one of a temperature of the target object, a humidity level surrounding the target object, or a utilization amount of the target object.

In an aspect, a system includes at least one data processor, and memory storing instructions which, when executed by the at least one data processor, causes the at least one data processor to perform operations including receiving sensor data characterizing measurements associated with a target object. The operations further include determining, based on the sensor data, an objective from a plurality of predefined objectives for monitoring the target object. The operations further include computing, based on the determined objective, a communication channel associated with the target object. The operations further include providing the communication channel.

One or more of the following features can be included in any feasible combination. For example, in some aspects, the operations can include determining one or more characteristic of the communication channel. In other aspects, the operations can include providing the determined one or more characteristics of the communication channel. In certain aspects, the determined characteristic can be at least one of a user preference or a status of the target object.

In some aspects, the operations can further include establishing the communication channel between a service provider and a user associated with the object. In some aspects, the service provider can be associated with the determined objective for monitoring the target object. In other aspects, the sensor data can include data associated with at least one of a timer, an accelerometer, a global positioning system, a position sensor, a thermometer, a humidity sensor, a visible light sensor, or a non-visible light sensor.

In some aspects, the operations can include receiving second sensor data characterizing second measurements associated with the target object at time after receiving previous sensor data.

In some aspects, the operations can include determining a status of the target object. In other aspects, the status of the target object can be based on at least one of a temperature of the target object, a humidity level surrounding the target object, or a utilization amount of the target object.

In an aspect, a non-transitory computer readable medium storing instructions, when executed by at least one data processor of at least on computing system causes the data processor to perform receiving sensor data characterizing measurements associated with a target object, determining, based on the sensor data, an objective from a plurality of predefined objectives for monitoring the target object, computing, based on the determined objective, a communication channel associated with the target object, and providing the communication channel.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, and the like.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
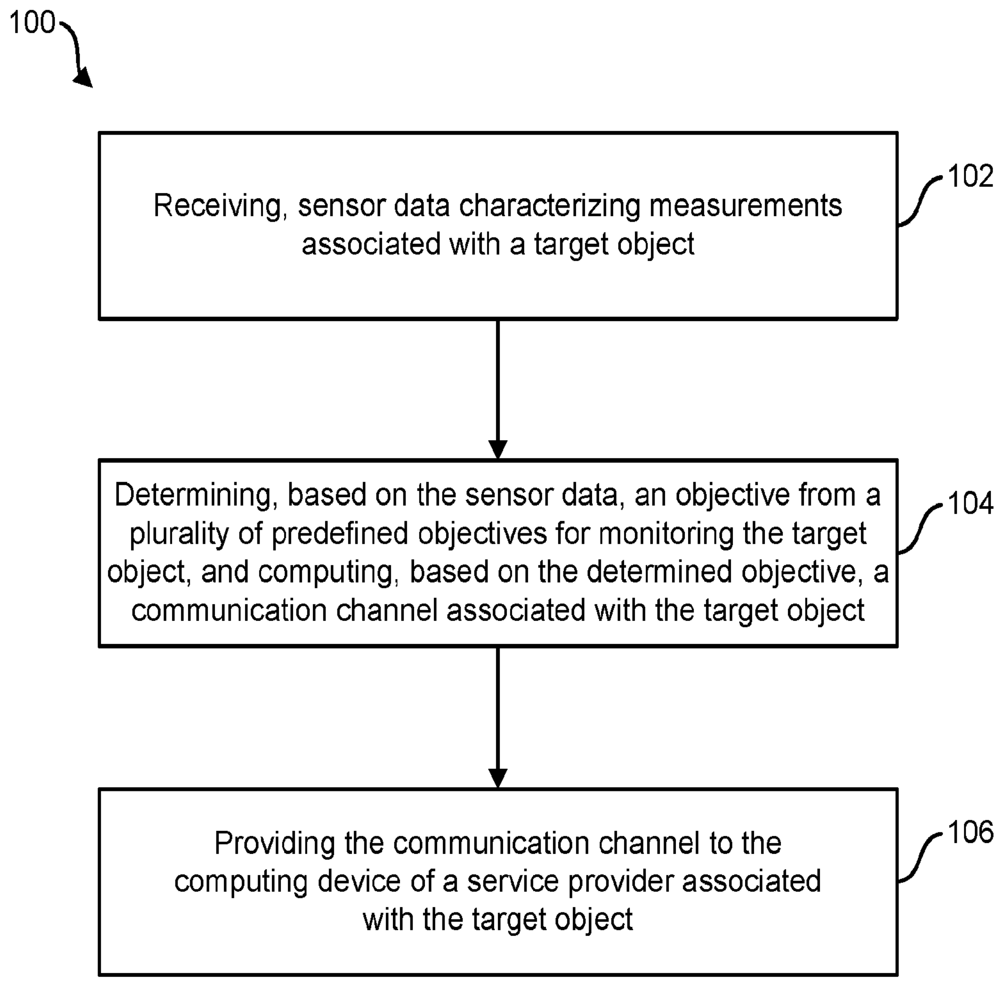
FIG. 1 is a flow chart of an exemplary method for providing a communication channel to a service provider based on the status of a target object by an object determined by a monitoring system.

Sensors are commonly used for monitoring and recording environmental conditions within an environment. The condition of the environment (e.g., humidity, temperature, etc.) may need to be maintained at desirable levels to prevent damage to an object within the environment. Maintenance operations can be performed based on manual measurements (e.g., occasional, infrequent, etc.) of conditions of an object or on periodic schedules based on historical norms or averages that have been observed to be appropriate and conservative. However, these schedules do not provide an immediate response to the actual conditions in the environment (e.g., in real-time), and may not account for an accelerated deterioration. Since sensors are only able to observe and record, the sensor cannot aid in returning the environment to desirable conditions, or connecting a user with a service who can remedy the problem. Alternately or additionally, responding based on a schedule may be time consuming and expensive.

Current monitoring devices can be used to monitor an object and determine a certain environmental factors associated with the object. The monitoring devices can include sensors (e.g., timer, accelerometer, global positioning system, position sensor, thermometer, humidity sensor, etc.) that can detect conditions (or events) associated with the target object. However, even though a user may be given this information about an object, the user may not have the knowledge of experience to perform preventative maintenance or remedy an event, which has caused damage to the object. In addition, the user may be unaware that certain sensor measurements may indicate damage to the object (e.g., high humidity levels).

Accordingly, some implementation of the current subject matter include placing a sensor on a target object, which can determine a status of the target object. The sensor is communicatively coupled to a server, which can contain prestored information about statuses of target objects and associated third-party service providers. The determination of the status of the object can be based on, for example, environmental conditions associated with the object (e.g., temperature, humidity, etc.), object utilization (e.g., time since the last maintenance), a triggering of a predetermined object condition (or conditions), and the like. Based on the determined status of the target object, the monitoring device can determine a response strategy (or an objective) associated with the status through a machine-learning algorithm stored on a server. The response strategy can be carried out by the monitoring system (e.g., sending a notification to the user of the target object). Additionally or alternately, the monitoring system can instruct a third party service provider to establish a direct communication channel with the target object and/or the user of the target object. By automatically connecting a user with a third party service provider, who is already associated with the status of the target object, the user can ensure that the target object is receiving proper maintenance and repair, and that the user is interacting with the target object properly.

For example, the monitoring system can include a sensor in a guitar that can monitor humidity and motion. When the monitoring system detects that the humidity is at an undesired level (e.g., above a predetermined level), the monitoring system can notify a supplier of humidity remediation. Based on the notification, the supplier can establish a communication channel with the owner of the guitar (e.g., send an email to the user recommending purchase of a humidity remediation solution). In another example, the monitoring system can detect that the guitar may be dropped, and can notify the manufacturer. The owner can receive a call from the manufacturer to help them in assessing the damage.

In some implementations, the monitoring system is generic and not limited to specific target objects, service providers or communication channels. For example, the target objects can include retail products (e.g., guitars, alcohol, tobacco products, and the like), and the communication channels can include email, text, phone call, application notification, and the like.

In some implementations, the monitoring system can select a service provider (e.g., from a list of service providers) and notify the selected service provider. The selection of the service provider can be based on the status of the target object (e.g., guitar). For example, if the guitar needs humidity remediation, a supplier of humidity remediation can be notified. As another example, if the strings of the guitar need to be replaced, a supplier of guitar strings can be notified. In some implementations, the monitoring system can allow for target marketing (e.g., based on status of the target object being monitored) where advertisers are notified based on the needs (e.g., determined by the monitoring system) of the user. Additionally or alternately, the election of the service provider can be based on the preferences of the user of the target object (e.g., the user may prefer to be contacted by service providers located in a predetermined geographical location).

In some implementations, the communication channel between the third party provider (or the monitoring system)

can be temporary (e.g., exist during the time duration in which the target object has not been attended). In some implementations, the notification to the service provider can include instruction for the service provider. For example, the notification can include characteristics of the communication channel based on user preference, status of the target object, and the like. Additionally or alternately, the notification can be determined based on real-world data about the target object.

In some implementations, an application associated with a computing device of the end user can receive sensor data detected by sensors operatively coupled to the object. The sensor data can include, for example, temperature, humidity, motion, impact, location, sound level, vibration, and the like, associated with the object. This data can be combined with data sourced from outside references such as weather reports, event announcements, emergency incidents, and the like, and can be used by the system to independently assess the state of the object.

FIG. 1 is a flow chart of an exemplary method for generating a communication channel based on the input from a monitoring system. At 102, data characterizing a plurality of measurements, such as temperature, humidity, and motion, of a characteristic property of a target object (e.g., which can be detected by a sensor operatively arranged within proximity of the target object) is received and an output data set relating to the measurements is generated. The data can be received, for example, by a platform (or a server) of the monitoring system.

Figure 2:
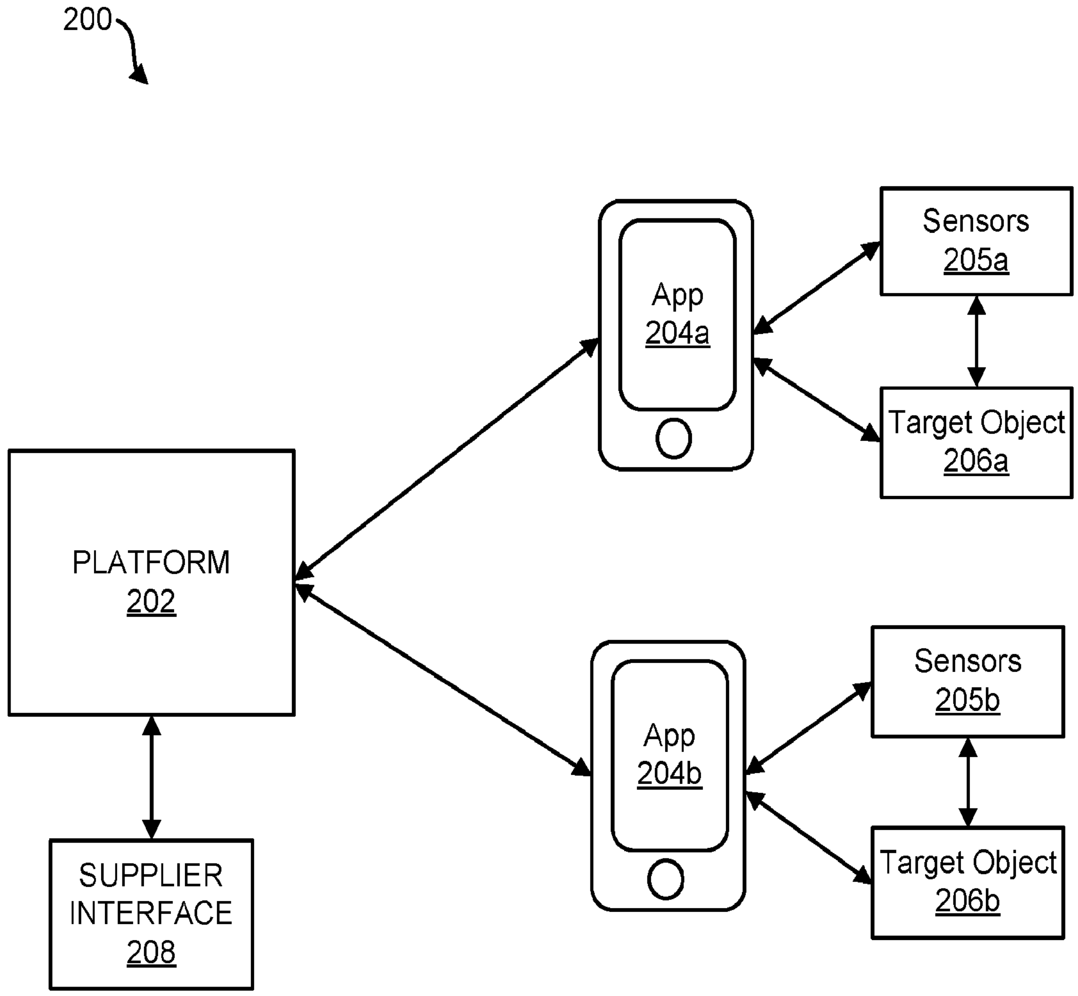
FIG. 2 illustrates an exemplary object monitoring system configured to monitor multiple target objects.

Various components of the monitoring system can be distributed over a cloud, operating devices of users of multiple target objects, locations of the target object (e.g., sensors arranged within proximity of the target object and the like). For example, FIG. 2 illustrates an exemplary monitoring system 200 that includes a platform 202; applications 204*a* and 204*b*; sensors 205*a* and 205*b*; and a supplier interface 208.

The monitoring system 200 can monitor and provide output data sets to the target objects 206*a* and 206*b*. The sensor 205*a* (or 205*b*) can detect a characteristic property of the target object 206*a* (or 206*b*) and transmit the detected characteristic property to the application 204*a* (or 204*b*). The application 204*a* (or 204*b*) can be installed on a computing device (e.g., laptop, mobile device, and the like) of the user of the target object 206*a* (or 206*b*). The application can curate the received sensor data and/or transmit the sensor data to the platform 202. In some implementations, the application can be used by end users to place new orders (e.g., replenishing consumable products), request object information, receive information or instructions to properly maintain the target object, and the like.

The platform 202 can receive the data from the applications 204*a* (or 204*b*) (e.g., data characterizing a measurement of the characteristic property of the target object) and/or sensor data directly from the sensor 205*a* (or 205*b*). The supplier interface 208 can allow the supplier to access information in the monitoring system 200 (e.g., information about the product/object, end users, and the like).

Communication among platform 202; applications 204*a* and 204*b*; and sensors 205*a* and 205*b* can be achieved via one or more of WiFi, Cellular Radio, Bluetooth, low data rate infrastructure, direct wiring, and the like. In some implementations, one or more relay stations can allow for communication among the components of the object monitoring system 200. In some implementations, the various components of the monitoring system 200 can include data storage devices (e.g., memory, RAM, and the like) that can curate received/generated information.

Referring again to FIG. 1, at 104, the platform 202 generates an output data set for the target object 206*a* (or 206*b*) based on the received data. As described below, the generation of the communication channel can also be based on various data (e.g., result associated with the implementation of a previous communication channel on the target object 206*a*, sensor data from multiple target objects, expert data, and the like). Furthermore, the communication channel can be generated by application of various rules (e.g., predetermined rules, rules provided by experts, and the like) on the various data.

Figure 3:
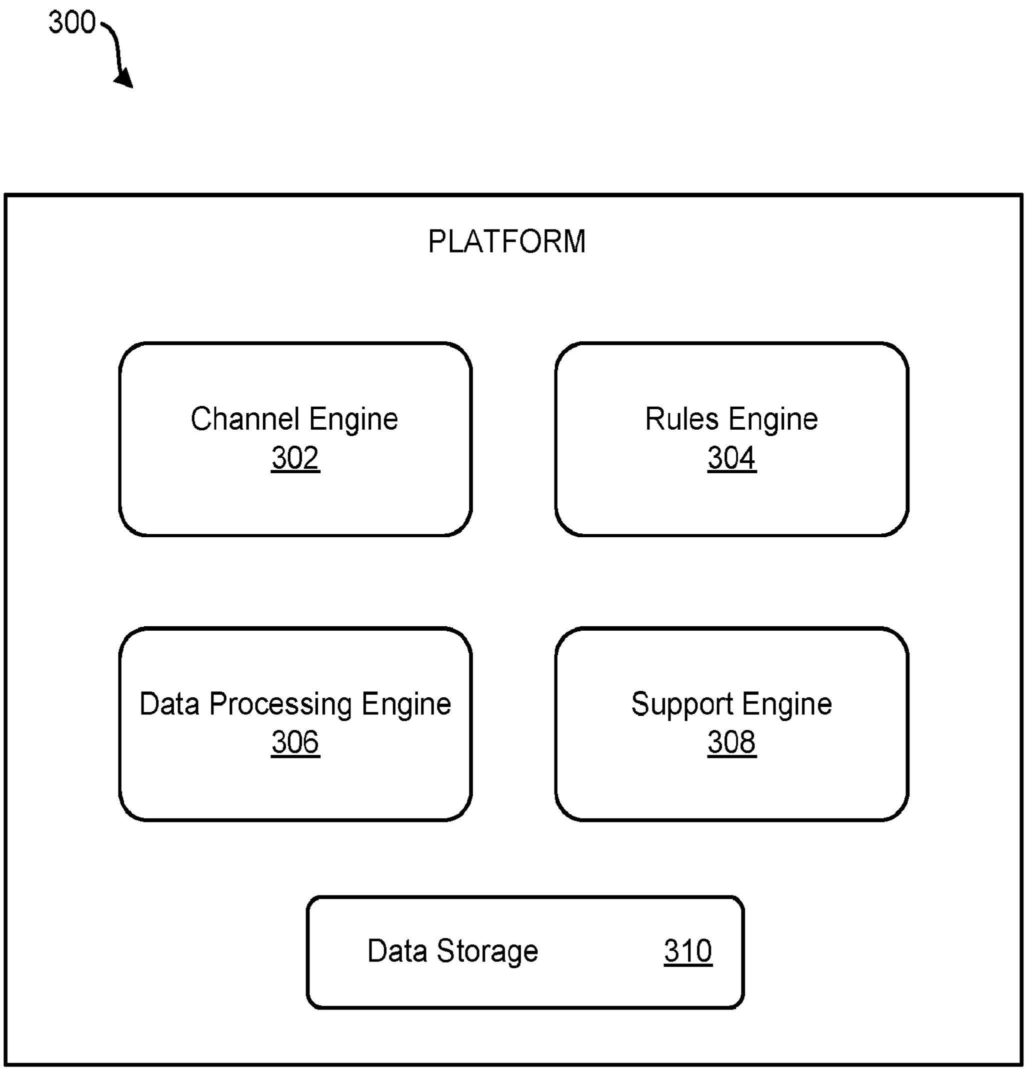
FIG. 3 illustrates an exemplary server associated with the object monitoring system of FIG. 2.

FIG. 3 illustrates an exemplary platform 300. The platform 300 can include a channel engine 302, rules engine 304, data processing engine 306, support engine 308 and data storage 310. The platform 300 can receive data from various sources (e.g., sensors operatively coupled to the objects, external database, experts, and the like). The channel engine 302 can generate communication channels based on, for example, received data, rules generated by the rules engine 304 (and/or rules from experts). The data processing engine can process the received data (or a portion thereof) and the support engine 308 can respond to queries from the end user.

The data storage 310 can store various information associated with the target objects. For example, data storage 310 can included the lifecycle information of the target object (e.g., stage of the object, milestone of the object, action level criteria, notifications associated with the object, and the like). The data storage 310 can also include information associated with the class or group associated with the target object. The group information can include, for example, summary notice content in target objects of the group, summary notice call to action in multiple target objects in the group, and the like.

Figure 4:
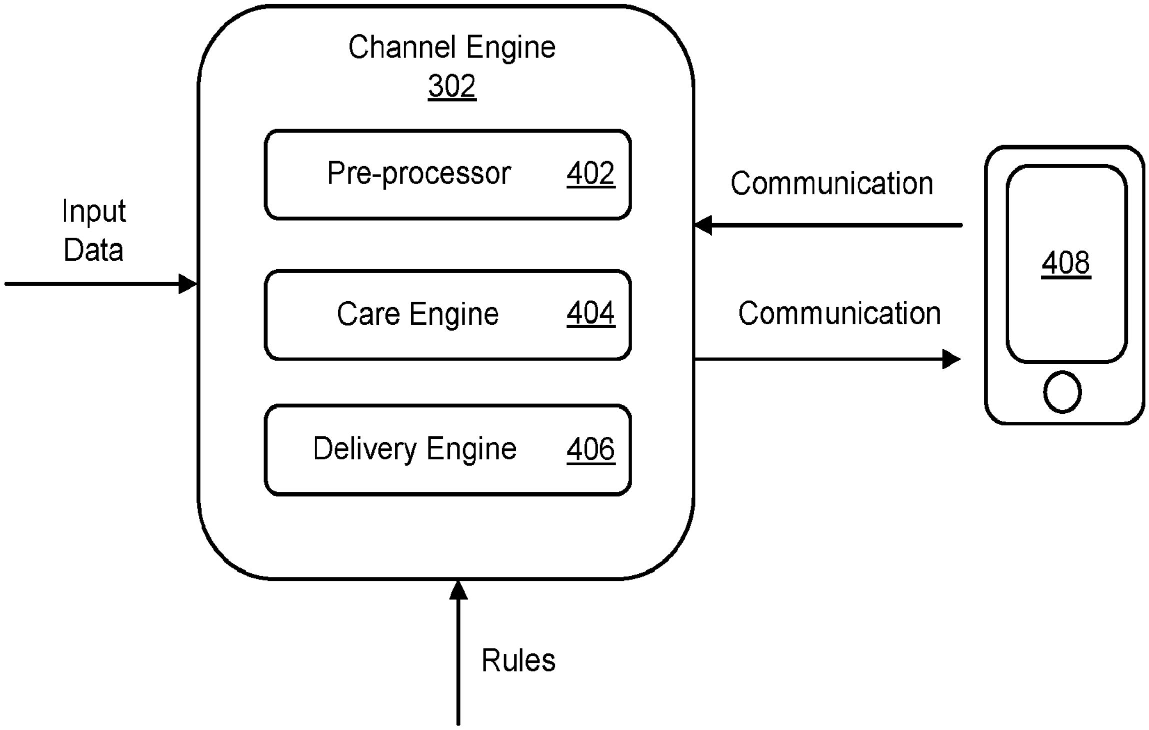
FIG. 4 illustrates an exemplary channel engine associated with the server of FIG. 3.

FIG. 4 illustrates an exemplary channel engine 302. The channel engine 302 can receive data from various sources (e.g., sensor data, rules from the rules engine, data from data storage 310, and the like) and can generate communication channel for the target object. In some implementations, the communication channel can connect a user to third party service provider who can act to protect, preserve or better use the target object associated with the communication channel. The channel engine 302 can include a pre-processor engine 402, a care engine 404 and the delivery engine 406. The pre-processor engine 402 can process received data (e.g., sensor data, data from data storage 310, and the like). In some implementations, the processing of data can be done to prepare (or analyze) the data for execution by the care/delivery engines. For example, received data can be unstructured, or only a fraction of the data may be needed to produce an actionable insight by the care and delivery engines. The pre-processor engine 402 can select the desirable sub-set of data and/or prepare the data for usage by the care/delivery engines.

In some implementations, an algorithm or rule can analyze the received data and determine communication channel characteristics (e.g., whether the communication channel should be in a text form or a video form). This determination can be on historical user response to various communication channels (e.g., how often the user used previous communication channels, how long the user spent engaging with the object monitoring system, how successful the resulting care actions were, etc.) to determine communication channel characteristics. In some implementations, communication channel characteristics can be transmitted to the delivery engine.

The care engine 404 can receive processed data from the pre-processor 402 and can generate communication channels. For example, the care engine 404 can apply rules (e.g., group rules, individual object rules, expert rules, and the like) received from the rules engine 304 and can apply those rules on the received data. Rules can be applied based on defined triggers. In some implementations, triggers can be time based, based on received data, an external event from a supplier's server, and the like. When a trigger fires, the care engine 404 can determine which rule or rules need to be executed. The execution of the rule may take place on the same server as the care engine or on a different server. The rule may or may not be provided all of the data with the trigger that is needed to execute the rule. If additional data is needed, the care engine 404 may try and get the data from a database, server, or other location. The care engine 404 can process the rule with the limited data, or may stop the execution of the rule.

In some implementations, the care engine 404 can determine an evaluation parameter for one or more registered target objects by applying the received rules on the received data. Based on the evaluation score, the channel engine can make a determination if a communication channel needs to be made. In some implementations, the communication channel can be determined (e.g., selected from a predetermined list of communication channels) based on the evaluation score. The communication channel can indicate, for example, if an operating state (or operating parameter) of the target object should be changed by the end user.

Referring again to FIG. 1, at 106, the generated communication channel (e.g., generated by the care engine 404) can be transmitted to the computing device (e.g., application 204*a* in the user computing device) associated with the first target object (e.g., 206). The delivery engine 406 can generate parameters associated with the communication ("communication parameters") of the communication channels generated by the care engine 402. For example, the delivery engine 406 can determine the schedule for providing the communication channel to the user. In some implementations, the communication parameters can be based rules provide by a Digital Marketing Subject Matter Expert (DSME). In some implementations, the delivery engine 406 can determine additional information associated with the communication channel. For example, the delivery engine 406 can determine a schedule associated with the implementation of the communication channel (e.g., when the communication channel needs to be implemented, and the like).

In some implementations, the delivery engine 406 can include a transmission machine learning algorithm. The transmission machine learning algorithm can generate the communication parameters based on information associated with the target object (e.g., personalized information for a given target object or the user of the target object), sensor data from the target object, input from DSME, and the like. In some implementations, the DSME can review and edit the communication parameters.

In some implementations, the channel engine 302 can perform multiple iterations (e.g., based on new data, new rules, trigger inputs from the end user, trigger inputs based on predetermined condition, trigger inputs from experts and the like). In some implementations, an input from the PSME can trigger the channel engine 302 (e.g., to generate communication channel). The input from the PSME can include state/milestone of the target object, conditions/limiting values associated with the various states of the target object, and the like. The channel engine 302 can include one or more of a genetic algorithm, Bayesian network, rete algorithm, inference engine, predictive model, business rule, machine learning model, neural network, classification system (e.g., random forest), regression system (e.g., least squares), and the like. In some implementations, the PSME can instruct the channel engine 302 to perform a machine learning process (e.g., based on data in data storage 310).

Figure 5:
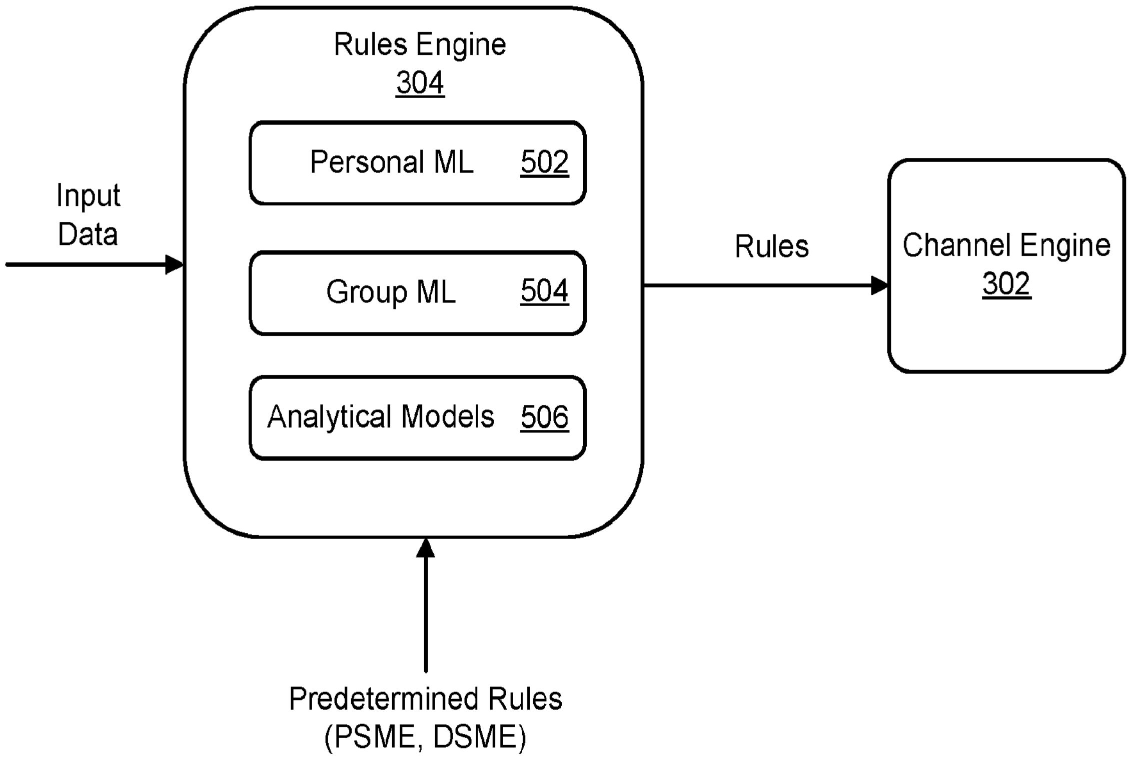
FIG. 5 illustrates an exemplary rules engine associated with the server of FIG. 3.

FIG. 5 illustrates an exemplary rules engine 304. The rules engine 304 can include a personal machine learning algorithm 502, a group machine learning algorithm 504 and analytical models 506. The personal machine learning algorithm 502 can generate a first set of object rules based on information associated with a given target object (e.g., personalized information for a given target object or the user of the target object) and/or macro trend information. The target object information can include one or more of data provided the by user of the target object, sensor data from the target object, data associated with a result from the implementation of a previous communication channel (e.g., from the platform 300 to the target object).

The group machine learning algorithm 504 can generate a second set of object rules based on information associated with a group (e.g., predefined group) associated with the target object. For example, the information can include macro trend information associated with the group of target objects. The target object information can include sensor measurements associated with a plurality of target objects in the group, group data from the data storage 310. In some implementations, the information can include personalized information.

In some implementations, generating the first (or second) set of rules can include using predetermined analytical models and varying the properties of the analytical models (e.g., predetermined constants in the analytical model) based on the above-mentioned personalized information (or macro trend information). In some implementations, the analytical models can include previously implemented rules. Based on new information (e.g., newly detected sensor data, new personalized information, new macro trend information, and the like), the previously implemented rules can be modified to generate new rules. In some implementations, the previously implemented first/second set of rules can be modified based on input rules provided by a PSME.

Figure 6:
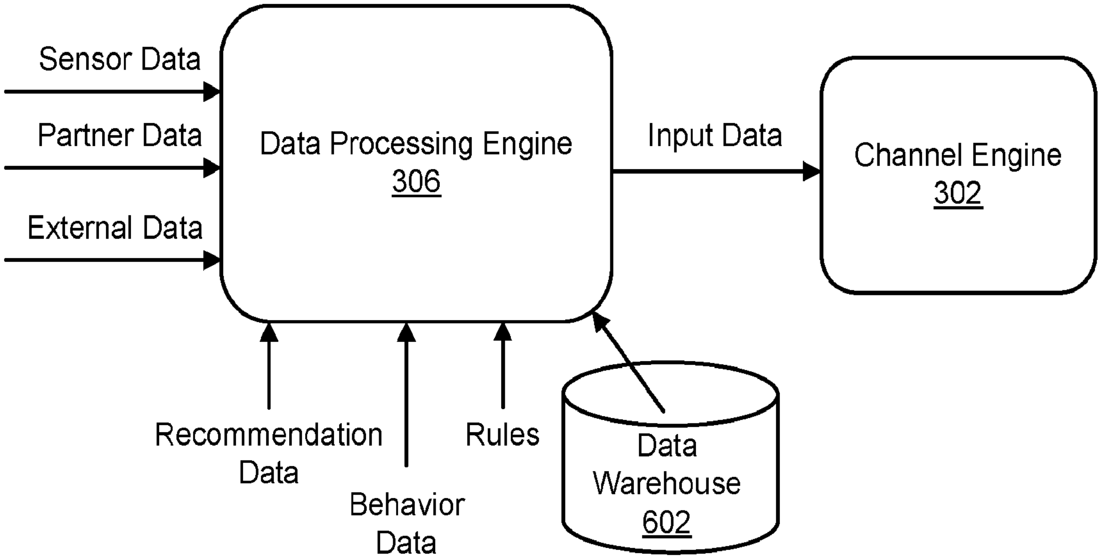
FIG. 6 illustrates an exemplary data processing engine associated with the server of FIG. 3.

FIG. 6 illustrates an exemplary data processing engine 306. The data processing engine 306 can receive one or more of sensor data, communication channel data (e.g., data characterizing result of implementation of a communication channel), external data (e.g., geographic/weather data associated with a target object), partner data (e.g., data from a partner organization), behavior data (e.g., data associated with the past behavior of the object and/or user of the object), rules (e.g., rules from rules engine 306, and the like). The data processing engine 304 can process the received data to a form that can be used by the channel engine 302. In some implementations, the data processing engine can additionally process data and/or transform the data into a form that can be used by other users and services (e.g., supplier servers, data visualization software, data analytics, market research companies, software services such as customer support systems, marketing automation systems, customer relationship management systems, ecommerce systems, content management systems, inventory management, etc.). In some implementations, the data processing engine 306 can receive data from a data warehouse 602 that can store curated data associated with the object monitoring system.

Figure 7:
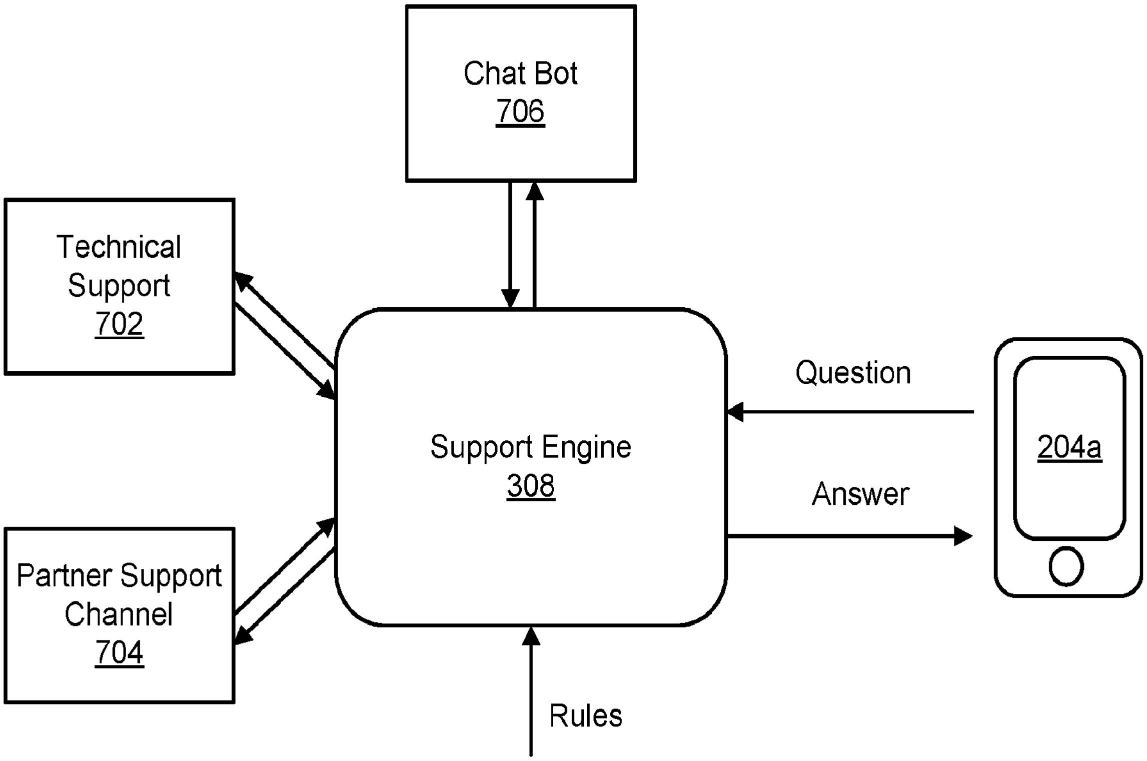
FIG. 7 illustrates an exemplary support engine associated with the server of FIG. 3.

FIG. 7 illustrates an exemplary support engine 308. The support engine 308 can receive question/queries from a user of the application 204a (or 204b) executed in an operating device of the user of the object. For example, the user can ask questions related to the upkeep of the object (e.g., desirable temperature/conductivity associated with the object, precautionary steps that need to be taken in view of an impending set of external conditions, and the like). The support engine 308 can communicate with technical support 702, partner support channel 704, and a chat hot 706 in order to generate a reply to the user question. In some implementations, the support engine can peruse through a predetermined list of question in a database and identify a match for the received question, and generate an answer based on the predetermined list of answers in the database. In some implementations, the support engine 308 can transmit the received question to a technical support 702 or a chat hot 706 and request an answer. In some implementations, the support engine 308 can receive data from a partner support channel 704 and can retrieve the answer from the received data. In some implementations, the support engine 308 can also receive rules (e.g., from PSME, rules engine 304, and the like) and can apply the rules on existing data to determine the answer to the user question. After the answer has been determined the support engine 308 can transmit the answer to the user.

Figure 8:
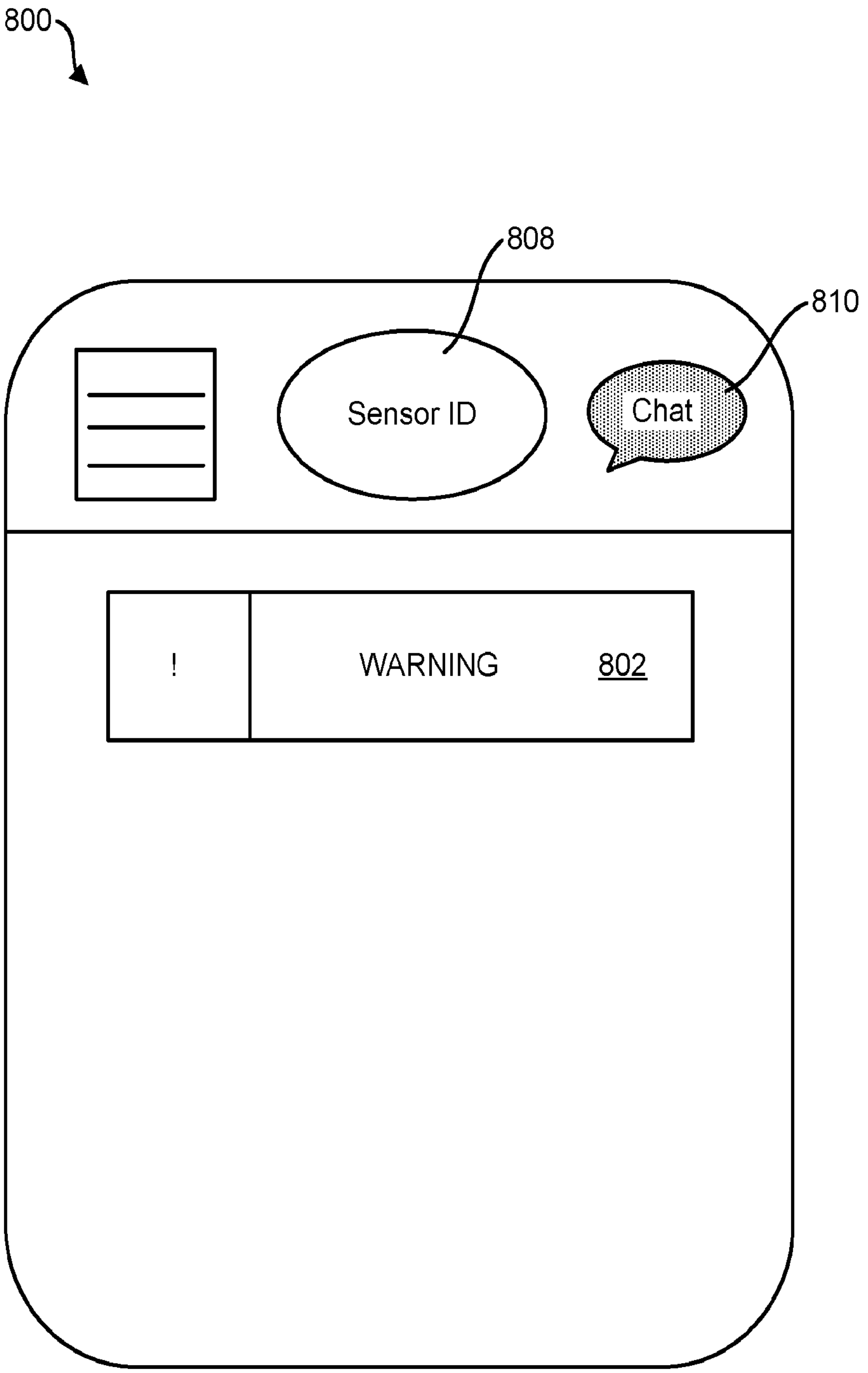
FIG. 8 illustrates an exemplary graphical user interface (GUI) display space of an application associated with the object monitoring system of FIG. 2.

FIG. 8 illustrates an exemplary graphical user interface (GUI) display space 800 associated with the application (e.g., application 204a, 204b, and the like) executed on a user computing device. The GUI display space 800 can include a warning graphical object 802.

The warning graphical object 802 can be displayed when the platform 300 transmits a warning signal to the application. For example, based on sensor data, the platform 300 can determine that the operating conditions of the object are undesirable, and can warn the user. In some implementations, the application can include a predetermined set of rules that can be executed by a processor associated with the application. Based on the predetermined set of rules, the application can determine whether the operating conditions (e.g., detected by sensors coupled to the object) are undesirable. Once undesirable operating parameter of the object has been determined, the warning graphical object 802 can be displayed.

The GUI display space 800 can include the identity of the sensor (or the target object) that is under observation by the application. Sensor ID information can be helpful if the application is associated with multiple sensors (or target objects).

The GUI display space 800 can include a query graphical object 810 that can allow the user to interact with the platform 300. For example, the user can transmit questions to the support engine 308 via the query graphical object 810. In some implementations, the end user (or an object associated with the end user) can be registered with the object monitoring system via the GUI display space 800. In some implementations, sensors (e.g., operatively coupled to target objects) can be registered with the object monitoring system via the GUI display space 800.

In view of the above systems, certain target objects can be monitored using the system. Some implementations of the current subject matter can include a system to monitor and maintain musical instruments, tobacco products, and firearms.

Figure 9:
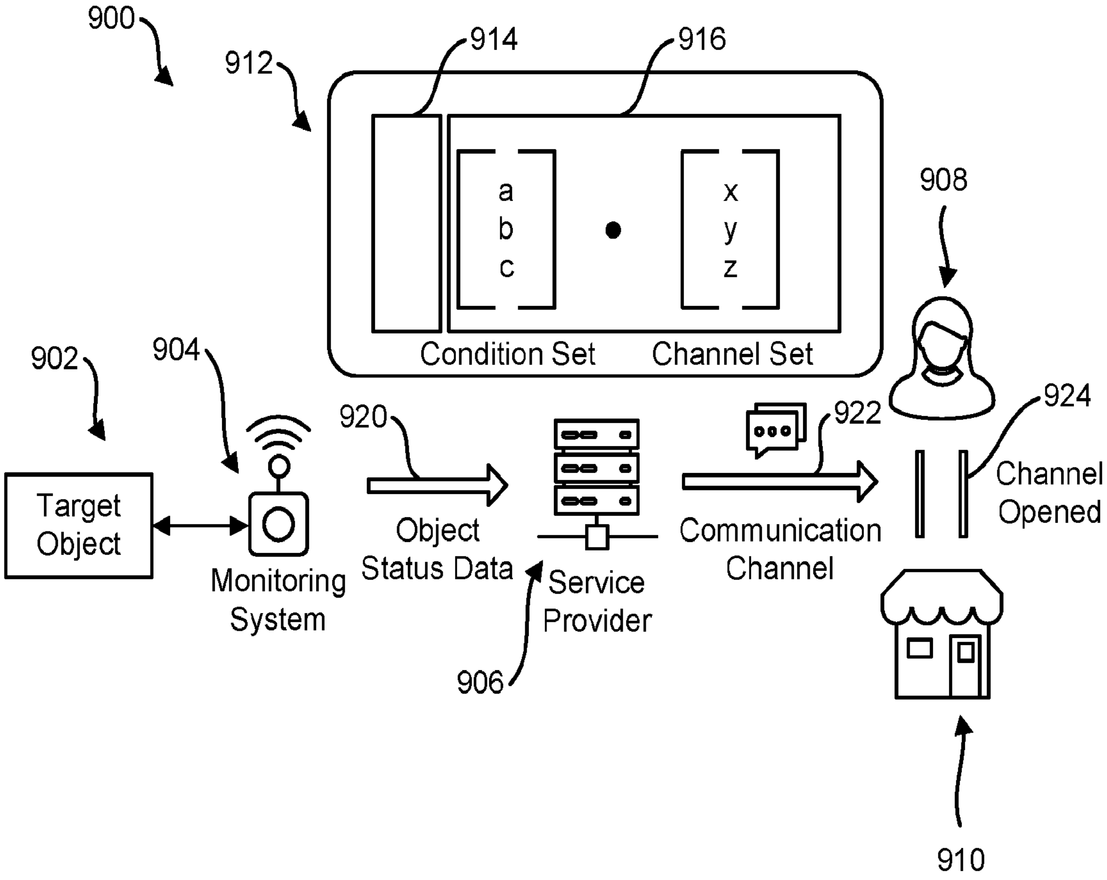
FIG. 9 illustrates an exemplary monitoring system communicatively coupled to a service provider.

FIG. 9 illustrates an exemplary monitoring system 900 communicatively coupled to a service provider 910. The monitoring system 900 can detect attributes of the target object 902 and determine a status associated with the target object 902. Based on the determined attribute, the monitoring system 900 can send a notification signal to the service provider 910. The service provider 910 can generate a communication channel 924 with one or more users 908 (or one or more computing devices) of the target object.

As illustrated in FIG. 9, a target object 902 is in communication with a sensor 904. The sensor 904 can be any type of sensor previously discussed, such as a humidity sensor, temperature sensor, motion sensor, etc. The sensor 904 observes the target object for changes which the sensor 904 is configured to detect.

For example, if the target object were a stringed musical instrument, like a guitar, the sensor 904 could be a humidity or motion sensor. Specific items such as setting the action, stringing the instrument, adjusting the truss rod, oiling the fret board, and the like, can all be actions which need to occur with a frequency related to the amount of times the guitar is used, along with preventing moisture damage to the instrument during storage.

In the event of a value recorded by the sensor falling out a threshold range, a signal 920 can be sent to a control unit 912, which can be a general purpose computer or a server. The control unit 912 includes a data processor 914 and a computer readable memory 916. The computer readable memory 916 can contain preset conditions and associated channels which can be established if a condition is met. When a condition is met, a list of service providers 906 can be parsed through by the processor 914 in order to determine an appropriate service provider who is also related to the channel which is being opened.

For example, if a string instrument is been exposed to too much moisture, a restoration company may be linked automatically to a user's device, such as a computer or phone. If though the device is a lawn mower which is not being used, the channel which is opened may be customer service of the builder of the lawn mower to ensure that the user does not have any confusion with how to operate the lawn mower.

With a service provider chosen from the list 906, a signal 922 is sent from the control unit 912 to the service provider 910. The signal 922 is an indication to the service provider 910 to open the communication channel 924 with the user 908. Once the channel 924 is opened, the signal 922 terminates and the channel 924 remains open without input form the control unit 912.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof.

These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features.

Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method, comprising:

receiving data characterizing measurements associated with a target object;

determining, based on the received data and using a predictive model, an objective from a plurality of predefined objectives for monitoring the target object wherein the predictive model compares the received data to nominal characteristics associated with the target object;

computing, based on the determined objective, a communication channel from a plurality of communication channels associated with the target object, wherein the computation is based on an evaluation of historical user responses with the plurality of communication channels;

providing the communication channel to a user device associated with the target object;

updating the communication channel using the predictive model, wherein the update is performed in response to a user interaction with the communication channel and the evaluation of the historical user responses, and wherein the update computes an updated communication channel from the plurality of communication channels; and providing the updated communication channel to the user device associated with the target object.

2. The method of claim 1, further comprising determining one or more characteristic of the communication channel.

3. The method of claim 2, further comprising providing the determined one or more characteristics of the communication channel.

4. The method of claim 3, wherein the determined characteristic is at least one of:

a user preference; or a status of the target object.

5. The method of claim 1, further comprising establishing the communication channel between a service provider and a user associated with the object via a server containing a machine-learning algorithm, a plurality of pre-stored statuses of the target object, and a plurality of associated service providers.

6. The method of claim 5, wherein the service provider is associated with the determined objective for monitoring the target object via the machine-learning algorithm, the plurality of pre-stored statuses the target object, and the plurality of associated service providers.

7. The method of claim 1, wherein the data comprises data associated with at least one of:

a timer;
an accelerometer;
a global positioning system;
a position sensor;
a thermometer;
a humidity sensor;
a visible light sensor; or
a non-visible light sensor.

8. The method of claim 1, wherein a sensor is arranged adjacent to the target object;

a server is communicatively coupled to the sensor, the server configured to contain a machine learning algorithm, a plurality of pre-stored statuses of the target object, and a plurality of associated service providers;
a first communication device is associated with the user; and
a second communication device is associated with the service provider,
wherein the communication channel links the first communication device and the second communication device in order to transmit data.

9. The method of claim 1, further comprising determining a status of the target object.

10. The method of claim 9, wherein the status of the target object is based on at least one of:

a temperature of the target object;
a humidity level surrounding the target object; or
a utilization amount of the target object.

11. A system comprising:

at least one data processor;
memory storing instructions which, when executed by the at least one data processor, causes the at least one data processor to perform operations comprising:
receiving data characterizing measurements associated with a target object;
determining, based on the received data and using a predictive model, an objective from a plurality of predefined objectives for monitoring the target object, wherein the predictive model compares the received data to nominal characteristics associated with the target object;
computing, based on the determined objective, a communication channel from a plurality of communication channels associated with the target object, wherein the computation is based on an evaluation of historical user responses with the plurality of communication channels;
providing the communication channel to a user device associated with the target object;
updating the communication channel using the predictive model, wherein the update is performed in response to a user interaction with the communication channel and the evaluation of historical user responses, and wherein the update computes an updated communication channel from the plurality of communication channels; and
providing the updated communication channel to the user device associated with the target object.

12. The system of claim 11, wherein the operations further comprise determining one or more characteristic of the communication channel.

13. The system of claim 12, wherein the operations further comprise providing the determined one or more characteristics of the communication channel.

14. The system of claim 13, wherein the determined characteristic is at least one of:

a user preference; or
a status of the target object.

15. The system of claim 11, wherein the operations further comprise establishing the communication channel between a service provider associated with the determined objective and a user associated with the target object.

16. The system of claim 11, further comprising:

a sensor arranged adjacent to the target object;
a server communicatively coupled to the sensor; the server configured to contain a machine learning algorithm, a plurality of pre-stored statuses of the target object, and a plurality of associated service providers;
a first communication device associated with the user; and
a second communication device associated with the service provider,
wherein the communication channel links the first communication device and the second communication device in order to transmit data.

17. The system of claim 11, wherein the sensor data comprises data associated with at least one of:

a timer;
an accelerometer;
a global positioning system;
a position sensor;
a thermometer;
a humidity sensor;
a visible light sensor; or
a non-visible light sensor.

18. The system of claim 11, wherein the operations further comprise receiving second data characterizing second measurements associated with the target object at time after receiving previous sensor data.

19. The system of claim 11, wherein the operations further comprise determining a status of the target object.

20. A non-transitory computer readable medium storing instructions, which when executed by at least one data processor of at least on computing system, causes the at least one data processor to perform operations comprising:

receiving data characterizing measurements associated with a target object;
determining, based on the received data and using a predictive model, an objective from a plurality of predefined objectives for monitoring the target object, wherein the predictive model compares the received data to nominal characteristics associated with the target object;
computing, based on the determined objective, a communication channel from a plurality of communication channels associated with the target object wherein the computation is based on an evaluation of historical user responses with the plurality of communication channels;
providing the communication channel to a user device associated with the target object;
updating the communication channel using the predictive model, wherein the update is performed in response to a user interaction with the communication channel and the evaluation of the historical user responses, and wherein the update computes an updated communication channel from the plurality of communication channels; and providing the updated communication channel to the user device associated with the target object.

21. The method of claim 1, wherein the predictive model is trained on historical user interactions with the plurality of communication channels.

22. The method of claim 1, wherein the user interaction with the communication channel includes a user's response to the communication channel and additional data characterizing measurements associated with the target object.

23. The method of claim 1, wherein the user interaction with the communication channel is based on a measurement of responsiveness by the user.

24. The method of claim 1, wherein the updated communication channel is an alternative channel distinct from the initially provided communication channel.

* * * * *